March 16, 1943.    W. C. BARNES    2,313,729
TRACK TESTING APPARATUS
Original Filed June 8, 1935    3 Sheets-Sheet 1
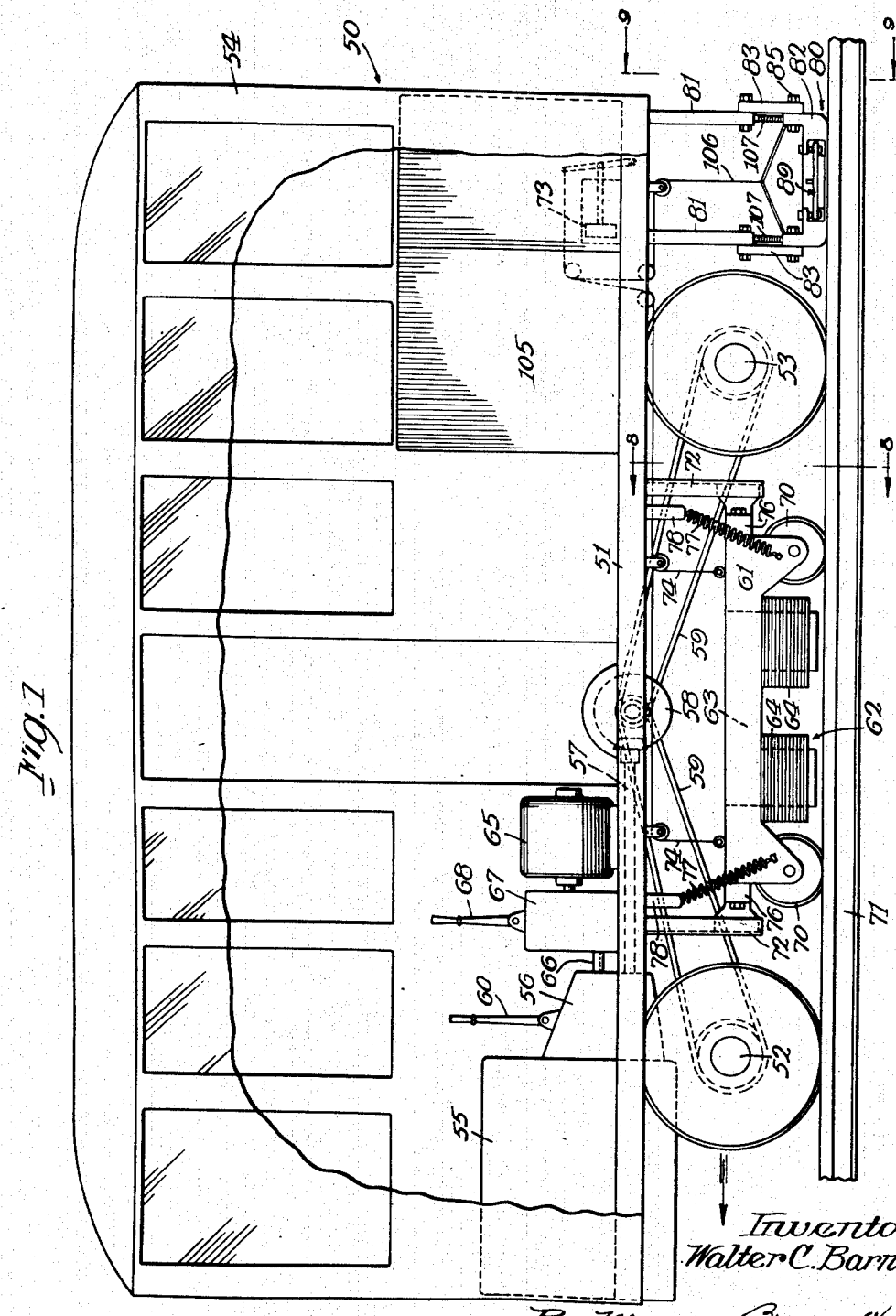

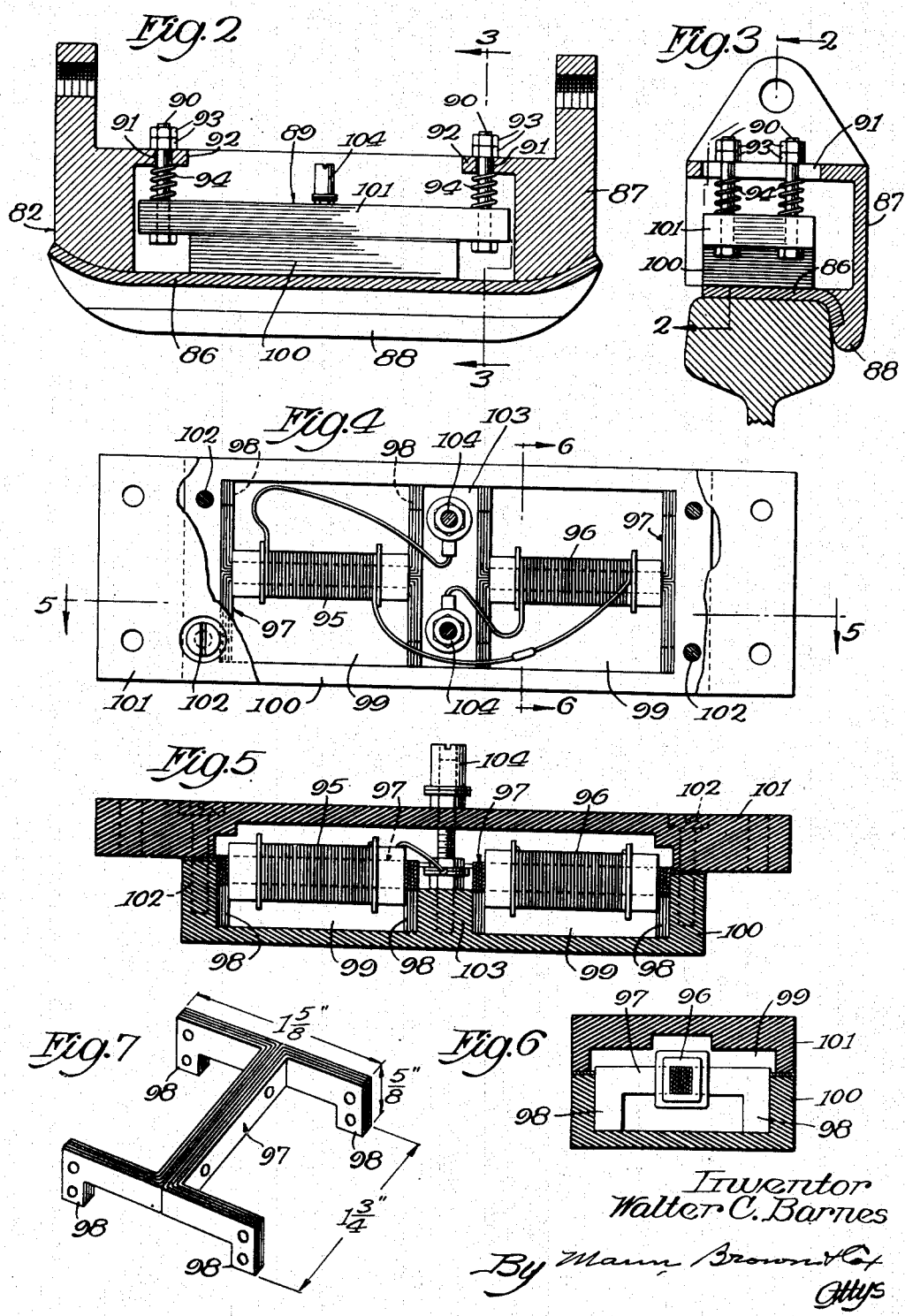

March 16, 1943.　　　W. C. BARNES　　　2,313,729
TRACK TESTING APPARATUS
Original Filed June 8, 1935　　3 Sheets-Sheet 3
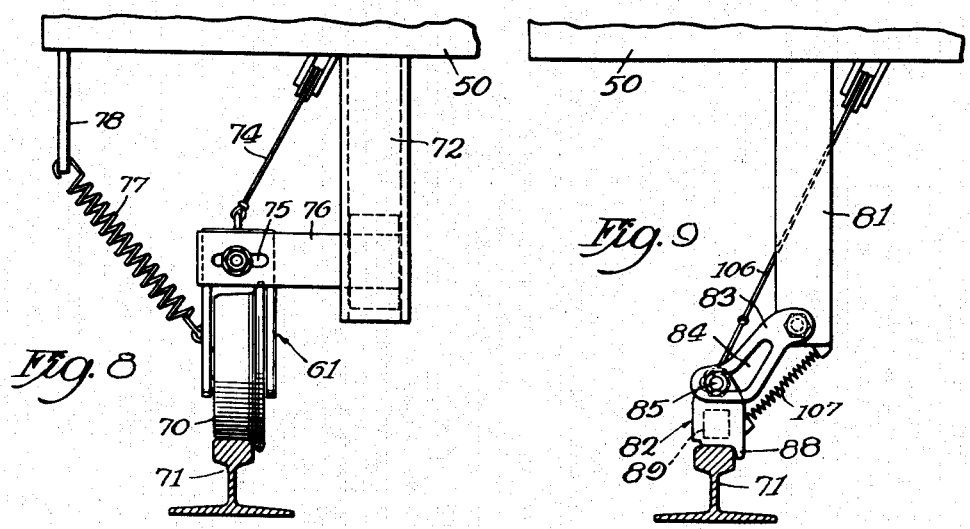
Inventor
Walter C. Barnes
By Mann, Brown & Co.
Attys.

Patented Mar. 16, 1943

2,313,729

UNITED STATES PATENT OFFICE 2,313,729

TRACK TESTING APPARATUS

Walter C. Barnes, Lake Bluff, Ill.

Original application June 8, 1935, Serial No. 25,586. Divided and this application December 13, 1939, Serial No. 309,208

20 Claims. (Cl. 175—183)

This invention relates to a rail flaw detector car and the principal object of the invention is to provide a simple and yet effective way for mounting the rail engaging equipment so that when lowered from its raised position it will be certain to find its proper position on the rail.

Further and other objects and advantages will become apparent as the disclosure proceeds and the description is read in conjunction with the accompanying drawings, in which Fig. 1 is a diagrammatic, side elevational view of the test car with one form of the apparatus for carrying out the invention;

Fig. 2 is a longitudinal, sectional view through the support casting for the detector shoe, the section being taken on the line 2—2 of Fig. 3;

Fig. 3 is a section taken on the line 3—3 of Fig. 2;

Fig. 4 is a plan view of a detector unit employing two longitudinally arranged detector coils connected in opposition, the top cover being broken away to expose the coils;

Fig. 5 is a longitudinal, sectional view taken on the line 5—5 of Fig. 4;

Fig. 6 is a transverse, sectional view taken on the line 6—6 of Fig. 4;

Fig. 7 is a perspective view of the core for one of the coils shown in Figs. 4 and 5;

Fig. 8 is a sectional view taken on the line 8—8 of Fig. 1 showing the means for mounting the magnet carriage on the car; and Fig. 9 is a sectional view taken on the line 9—9 of Fig. 1 showing the means for mounting the detector carriage on the car.

The invention is shown applied to a detector car using a method of testing in which a relatively strong magnetic field is set up in a portion of the body under test to cause it to be uniformly magnetized in a given direction and to overcome any magnetic condition that may have previously existed in that portion of the body. The energizing field is then removed and the space around the body is searched for traces of residual magnetism because it has been found that cracks, fissures, and such like cause a peculiar magnetic condition to be set up that can be detected externally by suitable means.

In the preferred form of the invention, a large electromagnet passes uni-directional magnetic flux through a portion of the body under test and the body is then explored for traces of residual magnetism by an induction coil suitably connected to amplifying and recording apparatus. This form of the invention is illustrated somewhat diagrammatically in Figs. 1-6 inclusive and will first be described.

The flaw detecting mechanism is mounted in a detector car, indicated at 50, comprising an underframe 51 mounted on wheeled axles 52 and 53 and supporting a house body 54, the forward end of which is adapted to house the necessary equipment for operating the car, the rear end being reserved for apparatus that is used in conjunction with the flaw detector mechanism.

The car is preferably powered by a governor controlled internal combustion engine 55 of approximately 60 H. P. capacity which transmits power through a clutch and transmission 56, drive shaft 57, gear box 58 and chain belts 59 to the axles 52 and 53 of the car. The lever 60 indicates an operating means for the clutch and transmission 56, the latter including a reverse gear for running the car backward.

Mounted between the axles 52 and 53 is a carriage 61 adapted to support a relatively large electromagnet 62 consisting of an iron core 63 and coils 64 that are energized by a generator 65 (preferably 110 volt, 2 k. w. direct current), driven by suitable means, as for example, from a power take-off 66 associated with the transmission 56. A clutch 67 operated by a lever 68 enables the generator to be disconnected from its drive whenever desired.

The source of power for the car and for driving the generator 65 is so much a matter of choice that further description is deemed unnecessary.

The electromagnet carriage 61 is equipped with flanged wheels 70 adapted to ride upon the track 71 with the wheel flanges in engagement with the gauge side of the rail. When the car is not being used for detection purposes, it is desirable to lift the electromagnet carriage from the rail, and this is accomplished by mounting the carriage in channel guides 72 which depend from the car underframe 51. The carriage is lifted by a piston 73 operated by compressed air and connected by cables 74 to the electromagnet carriage. There is a lost motion connection 75 (Fig. 8) between the carriage 61 and the arms 76 which travel in the guides 72 so that when the carriage is lifted by the cable 74, it moves toward the guides 72. The purpose of this arrangement is to cause the carriage to be lowered in such a manner that the flanges of the wheels 70 will always engage the gauge side of the rail instead of riding on the rail. Tension springs 77 attached at one end to the carriage and at the other end to lugs 78 hold the wheel flanges against the gauge side of the rail when the carriage has been lowered, the angularity of each spring, and its tension, being such that it only comes into play after the carriage has substantially reached its operative position.

The detector unit generally designated 80 is mounted beneath the rear end of the car and like the electromagnet carriage, is adapted to be lifted from the rail when the flaw detection apparatus is not being operated. The detection unit is pivotally supported from arms 81 extending downwardly from the car underframe, the connection between the detector carriage 82 and the arms being through links 83 equipped with cam slots 84, adapted to loosely receive carriage studs 85, as best shown in Figs. 1 and 9.

The carriage 82 is preferably made of brass and is equipped with a replaceable manganese steel runner 86 (Figs. 2 and 3). The body 87 of the carriage has a flange 88 which overhangs the gauge side of the rail and fixes the position of the detector shoe with respect to the rail head. The central portion of the carriage 82 is recessed to receive the detector shoe 89 (Fig. 2) which may be supported from the carriage by carriage bolts 90 which loosely pass through slots 91 in overhanging walls 92 of the carriage. Nuts 93 screw on to the projecting ends of the bolts 90 and cooperate with springs 94 interposed between the walls 92 and the detector shoe 89 for supporting the latter in proper position over the rail head. This particular mounting has the advantage that it enables the detector shoe to be adjusted both vertically and laterally with respect to the rail head.

When the detecting unit consists of inductive means, it is preferable to employ two longitudinally arranged coils 95 and 96 placed end to end and connected in opposition (that is so that any longitudinal flux, or component of flux that simultaneously acts on both coils will produce E. M. F.'s that oppose each other and consequently balance out). Each coil is mounted on an H-shaped core 97 (Fig. 7), the four legs of which are provided with downwardly extending feet 98. The cores are preferably laminated as best shown in Fig. 7 in order to better conduct longitudinal components of flux through the coils. The coils and their cores are mounted in recesses 99 provided in the detector shoe, the latter being preferably of Bakelite or some other insulating material and comprising a base 100 and cover 101, the latter being removably secured to the base by countersunk machine screws 102. The partition 103 between the recesses 99 receives the binding posts 104, as best shown in Figs. 4 and 5 to which the terminals of the coils 95 and 96 are connected. Suitable leads connect the binding posts 104 with amplifying apparatus conveniently mounted in a compartment 105 at the rear of the car.

The carriage 82 is lifted to inoperative position by a cable 106 attached at one end to the carriage and at the other end to the piston 73. When the carriage is raised, the cam slot 84 causes the carriage to move to the right (Fig. 9) so that when it is thereafter lowered, the flange 88 will be sure to fall inside of the gauge edge of the rail. Relatively light compression springs 107 extending between the arms 81 and the carriage 82 have their angularity and strength such that when the carriage has been substantially lowered to operative position, the springs will force the flange 88 of the carriage against the gauge side of the rail.

This application is a division of my earlier application filed jointly with Henry W. Keevil, on June 8, 1935, Serial No. 25,586.

What I claim is:

1. In rail flaw detecting mechanism, a car adapted to travel along a track, a support attached to the car and having a portion thereof offset from the vertical plane which includes the longitudinal axis of the adjacent rail, a detector carriage associated with said support, a gauge member carried by the carriage for engaging the gauge edge of the rail, a detector mechanism on said carriage, means for raising and lowering the carriage with respect to the rail, said carriage when in operating position being substantially centered with respect to said vertical plane, and means for mounting the carriage on the offset portion of the support so that at the instant the carriage strikes the rail when being lowered the gauge member on the carriage is yieldingly held inwardly of the gauge edge of the rail and as the lowering of the carriage is continued the gauge member is urged outwardly toward the gauge edge of the rail.

2. In rail flaw detecting mechanism, a car adapted to travel along a track, a support attached to the car and having a portion thereof offset from the vertical plane which includes the longitudinal axis of the adjacent rail, a detector carriage associated with said support, a gauge member carried by the carriage for engaging the gauge edge of the rail, a detector mechanism on said carriage, means for raising and lowering the carriage with respect to the rail, said carriage when in operating position being substantially centered with respect to said vertical plane, and means for mounting the carriage on the offset portion of the support so that at the instant the carriage strikes the rail when being lowered the gauge member on the carriage is yieldingly held inwardly of the gauge edge of the rail and as the lowering of the carriage is continued the gauge member is urged outwardly toward the gauge edge of the rail, said carriage mounting means including a horizontal pivot positioned in relatively close proximity to the adjacent rail and about which the carriage is adapted to rotate.

3. In rail flaw detecting mechanism, a car adapted to travel along a track, a support attached to the car and having a portion thereof offset from the vertical plane which includes the longitudinal axis of the adjacent rail, a detector carriage associated with said support, a gauge member carried by the carriage for engaging the gauge edge of the rail, a detector mechanism on said carriage, means for raising and lowering the carriage with respect to the rail, said carriage when in operating position being substantially centered with respect to said vertical plane, and means including a horizontal pivot for mounting the carriage on the offset portion of the support so that at the instant the carriage strikes the rail when being lowered, and immediately before, the carriage is cocked to one side about the pivot with the gauge member held inwardly of the gauge edge of the rail, and as the lowering of the carriage is continued, the carriage is rotated about the pivot to its normal horizontal position and simultaneously the gauge member is urged toward the gauge edge of the rail.

4. In a flaw detector for rails, a support on the car inwardly displaced from the longitudinal axis of the rail, a detector carriage pivotally mounted on the support and having means for contacting the gauge side of the railhead, rail flaw detecting means carried by the carriage, and means for moving said mechanism on its pivotal mounting in a direction for causing said contacting means to engage the gauge side of the railhead.

5. In rail flaw detecting mechanism, a car adapted to travel along a track, a support attached to the car and having a portion thereof offset from the vertical plane which includes the longitudinal axis of the adjacent rail, a carriage associated with said support, a gauge member carried by the carriage for engaging the gauge edge of the rail, a mechanism on said carriage, means for raising and lowering the carriage with respect to the rail, said carriage when in operating position being substantially centered with respect to said vertical plane and means for mounting the carriage on the offset portion of the support so that when in inoperative position, the carriage is cocked to one side, and further so that the movement of the carriage from inoperative to operative position is characterized by a substantially straight downward movement, and then, after the carriage strikes the rail by a leveling of the carriage to horizontal position and a lateral movement outwardly toward said gauge edge, said last-named means including a horizontal pivot positioned in relatively close proximity to the rail and about which the carriage is adapted to rotate.

6. In flaw detecting apparatus, a car, a detector carriage, means for mounting the carriage for limited universal movement whereby it is capable of following substantially all variations in rail contour and alinement, and means suspended from the car for exerting a downward and outward force on the carriage along a line which intersects the rail head.

7. In apparatus for detecting flaws in rail, a car, a detector carriage mounted on the car for movement along one of the rails, said mounting including means for permitting the carriage to have limited universal movement whereby it is capable of following substantially all variations in rail contour and alinement, and means for applying a downward and outward force on the carriage at a point immediately adjacent to the rail, the line of said force intersecting the rail head.

8. In apparatus for detecting flaws in rail, a car, a detector carriage, a resilient unit adapted to exert a downward and outward force on the lower portion of said carriage, means for mounting the carriage so that in operative position it rides on the rail without restraint other than the force exerted by the resilient unit, and means for moving the carriage along the rail.

9. In apparatus for detecting flaws in rail, a car, a detector carriage adapted to ride on the rail, means carried by said car for supporting said carriage for limited free movement on the rail and restraining said carriage under normal operating conditions only by a longitudinal propelling force, and means interconnecting said carried means and said carriage for imposing upon said carriage an inclined force acting downwardly and outwardly through the rail head.

10. In combination with a rail car, a part adapted to be moved with the car along one of the rails in a substantially uniform lateral position over the rail, means on the car for raising the part from the rail and for lowering the part to the rail, and mechanism associated with said means for causing the part to move in a straight vertical line without substantial lateral displacement until the part strikes the rail, after which the mechanism causes the part to move laterally into its operative position on the rail.

11. In a detector car, a detector carriage, a gauge runner for the detector carriage, means for mounting the detector carriage on the car whereby it may be raised from and lowered to the rail, means for lowering the carriage so that it is seated upon the rail with the gauge runner positioned inside the gauge edge of the rail, and means for applying an outward force on the carriage effective only after the carriage has been seated upon the rail for moving the gauge runner into engagement with the gauge edge of the rail.

12. A detector car, a carriage having a gauge runner adapted to locate it with respect to the rail, means for supporting the carriage for lateral movement thereof, means for raising and lowering the carriage, means for moving said supporting means outwardly to move the gauge runner of the carriage against the gauge edge after the carriage is lowered, and means rendered effective only after the carriage has been seated upon the rail for applying a downward and outward force upon the carriage.

13. Apparatus for detecting flaws in rail, a car, a detector carriage, a gauge runner for the carriage, means for mounting the detector carriage on the car whereby it may be raised from and lowered to the rail, said mounting means including a loose connection between the car and the carriage whereby it is free to follow substantially all contours of the railhead, and means for applying a yielding downward and outward force on the carriage, the resultant of which intersects that portion of the railhead lying on the gauge side of the rail center line.

14. A detector car, a carriage adapted to engage the rail, rail flaw detecting means carried by the carriage, means for mounting the carriage on the car whereby it may be raised from and lowered to the rail, means for urging the carriage downwardly and laterally on a line intersecting the railhead, and gauge runner means for limiting outward movement of the carriage with respect to the rail.

15. In apparatus of the class described, a car, a detector carriage mounted on the car and being capable of lateral movement with respect to the car, rail flaw detecting means carried by the carriage, means for raising the carriage from and lowering it to the rail, and an elongated side runner attached to the carriage and curved at its end upwardly and away from the gauge rail edge, said runner being at least as long as the carriage itself.

16. Apparatus for detecting flaws in rail, a car, a detector carriage, rail flaw detecting means carried by the carriage, said carriage including a lower carriage adapted to ride upon the rail and an upper support member, resilient means extending between the ends of the lower carriage and the support member transmitting a downward and outward force from the support member to the lower carriage, said lower carriage being free to ride upon the rail without lateral restraint other than that afforded by the resilient means, and a gauge runner carried by the carriage.

17. In a device of the class described, a detector unit, a carriage unit including means adapted to slide on the rail ahead of and behind the detector unit, and pressure means carried by a car and engaging the carriage unit at spaced points in front of and behind the detector unit and effective at said points for exerting a pressure on the carriage unit toward the rail for minimizing bouncing of the carriage unit.

18. In apparatus for detecting flaws in rail, a car, a detector carriage adapted to ride upon the rail, means carried by said car for supporting said carriage for limited free movement on the rail and restraining the carriage under operating conditions by a propelling force longitudinally with the rail, and means for applying a downward and outward force on the carriage at a point immediately adjacent to the rail along a line intersecting the railhead.

19. In combination with a rail car, a carriage adapted to be suspended on the car and moved along the rail surface, said carriage comprising a detector carrying lower portion and means intermediate the lower portion and the car pivotally mounted for movement about a fixed axis with respect to the car and pivotally supporting the lower portion for lateral movement about a horizontal axis, and means for exerting a downward and outward force upon the lower portion.

20. In apparatus for detecting flaws in rail, a car, a detector carriage adapted to ride on the rail, a member upon the car, means pivotally carried by said member for supporting said carriage for limited free movement laterally on the rail and for longitudinally propelling the carriage along the rail, and resilient means interconnecting the carriage and said member for imposing upon said carriage an inclined force acting downwardly and outwardly through the railhead.

WALTER C. BARNES.